United States Patent [19]
Hatch et al.

[11] Patent Number: 6,000,903
[45] Date of Patent: Dec. 14, 1999

[54] SHIPPING FRAME FOR FAN SECTION OF AIRCRAFT ENGINE

[75] Inventors: Robert F. Hatch; Ronald A. Rossway, both of Aurora; William J. Campion, Jr., Westminster, all of Colo.

[73] Assignee: Stanley Aviation Corporation, Aurora, Colo.

[21] Appl. No.: 08/888,688

[22] Filed: Jul. 7, 1997

Related U.S. Application Data

[63] Continuation-in-part of application No. 08/565,384, Nov. 30, 1995, Pat. No. 5,645,389.

[51] Int. Cl.⁶ .................................................. B65D 85/68
[52] U.S. Cl. ......................... 414/778; 206/319; 414/816
[58] Field of Search .................................. 414/343, 346, 414/350, 469, 396, 401, 584, 679, 778, 781, 800, 809, 812, 816; 269/17, 71, 46, 47, 50–52; 206/319

[56] References Cited

U.S. PATENT DOCUMENTS

| | | | |
|---|---|---|---|
| 2,594,586 | 4/1952 | Ries | 206/319 |
| 2,613,807 | 10/1952 | Higbee | 206/319 |
| 2,670,166 | 2/1954 | Applegate | 206/319 X |

(List continued on next page.)

FOREIGN PATENT DOCUMENTS

| | | | |
|---|---|---|---|
| 270055 | 7/1989 | Germany | 414/778 |
| 4114739 | 11/1992 | Germany | 414/778 |
| 153245 | 6/1989 | Japan | 414/778 |
| 2174042 | 10/1986 | United Kingdom | 414/679 |

OTHER PUBLICATIONS

No. 1: Product information advertisement by applicant RE: Core Engine Module.
No. 2: Product infomration advertisement by applicant Re: various types of ground support equipment to secure and transport components of a jet aircraft.
No. 3: Product information advertisement by applicant RE: a cradle device for securing a componenet of a jet aircraft engine.
No. 4: Product information advertisement by applicant Re: a cradle device for securing components of a jet aircraft engine.
No. 5: Product information advertisement by applicant Re: Engine Stand.
No. 6: Product information advertisement by applicant Re: Hydraulic Engine Stand.
No. 7: Relevant portions of a product information catalog by Advance Ground Systems Engineering Corporation of Anaheim, California (Oct. 23, 1990).

*Primary Examiner*—David A. Bucci
*Attorney, Agent, or Firm*—Fields and Johnson, P.C.

[57] ABSTRACT

A fan shipping frame includes a frame assembly for supporting a loaded fan section of a jet aircraft engine. A plurality of caster assemblies attached to the shipping frame provide locomotive capability and adjustable height positioning so that a loaded fan section may be transferred onto the appropriate transport aircraft or vehicle. Rail members mounted on the frame assembly are alignable with rail members of a fan dolly so that the fan section may be directly transferred from the fan dolly onto the shipping frame. A template integral with the shipping frame enables the fan section to be mounted thereon. A platform assembly rotatably mounted to the shipping frame may be deployed to enable the fan section to be tilted or tipped from a vertical transport position to a horizontal transport position wherein the shipping frame may be transported in either position. A storage container mounted on the shipping frame stores the removed fan blades of the fan section in either position. In one embodiment, a telescoping template support group is provided enabling the template to be raised or lowered so that it is able to readily connect to fan sections which have differing heights when mounted to structures such as the fan dolly.

22 Claims, 13 Drawing Sheets

U.S. PATENT DOCUMENTS

| | | | |
|---|---|---|---|
| 2,674,370 | 4/1954 | Iredell II | 206/319 |
| 2,674,371 | 4/1954 | Blackinton | 206/319 |
| 2,928,535 | 3/1960 | Simmons et al. | 206/319 |
| 2,982,395 | 5/1961 | Rados | 206/319 |
| 3,194,525 | 7/1965 | Webb | 206/319 X |
| 3,211,299 | 10/1965 | Metzrath | 206/319 X |
| 3,795,323 | 3/1974 | Ouska | 414/778 |
| 4,117,927 | 10/1978 | Gothsche | 206/319 |
| 4,239,196 | 12/1980 | Hanger | 269/17 |
| 4,640,419 | 2/1987 | Yang | 206/577 |
| 4,699,337 | 10/1987 | Lewis | 414/343 X |
| 5,086,920 | 2/1992 | Binienda | 206/335 |
| 5,127,638 | 7/1992 | Kent | 269/17 |
| 5,186,597 | 2/1993 | Blusterbaum et al. | 414/469 |
| 5,297,915 | 3/1994 | Bach | 269/17 X |
| 5,320,475 | 6/1994 | Pinder | 414/343 |
| 5,383,652 | 1/1995 | Van Den Berg | 269/17 |
| 5,413,449 | 5/1995 | Schoenherr et al. | 414/343 |
| 5,433,572 | 7/1995 | Swain et al. | 414/778 X |

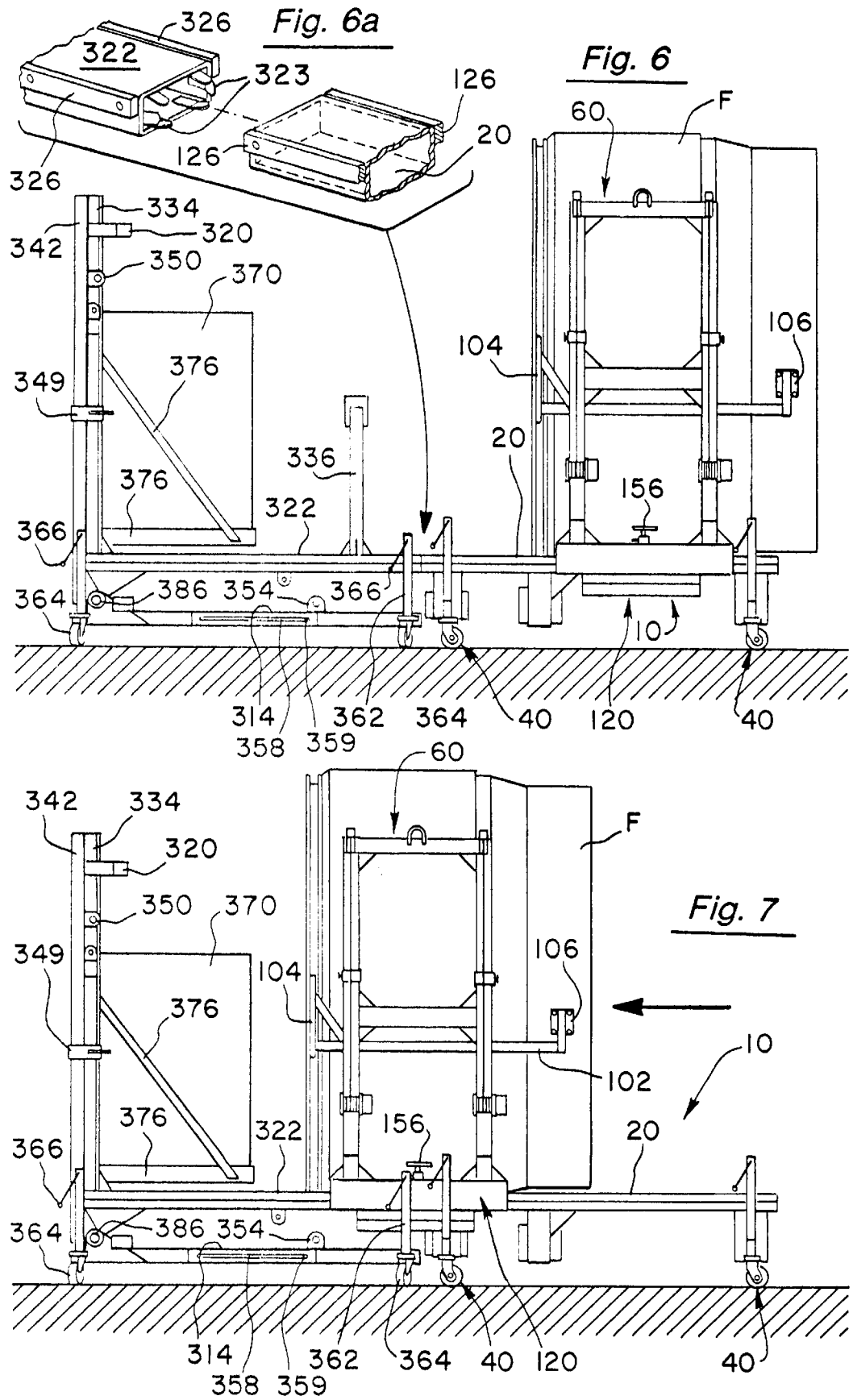

SHIPPING FRAME FOR FAN SECTION OF AIRCRAFT ENGINE

This application is a continuation-in-part of U.S. Ser. No. 08/565,384, filed Nov. 30, 1995, now U.S. Pat. No. 5,645,389, and entitled "Shipping Frame For Fan Section of Aircraft Engine."

TECHNICAL FIELD

This invention relates to an apparatus providing a means of transport for an object and, more particularly, to a shipping frame for the fan section of a jet aircraft engine.

BACKGROUND ART

In the commercial aircraft industry, a need has developed for the capability of transporting jet aircraft engine components in order that these components may be repaired or retrofitted. Jet aircraft engines are perhaps the most critical assembly of an aircraft wherein the engines must be inspected and maintained to the highest level of repair. Periodically, it is necessary to remove the engine from the wing or fuselage of an aircraft so that the jet aircraft engine and its components can undergo the necessary inspection and repairs. There are three major component sections of the jet aircraft engine; namely, the inlet cowl, the fan section, sometimes known as the fan case, and the core section. When the fan section is removed from the core section, this is known in the art as "engine splitting." The fan section may be removed from the core section either when the entire jet aircraft engine has been removed from the aircraft, or some circumstances dictate that only the fan section be removed while the core section remains attached to the aircraft.

Some prior art devices exist for securing and transporting jet aircraft engine components that have been removed from an aircraft. Typically, these prior art devices include a number of differing configurations which releasably secure the components and provide a means for moving the components so that it may be transported to the desired location for the needed inspection or repairs.

While the prior art devices may be adequate for their intended purposes; one significant shortfall, particularly for the transport of fan sections of a jet aircraft engine, is that the prior art does not provide a shipping frame which enables the fan section to be easily converted for transport in either a vertical or horizontal position. Furthermore, the prior art does not provide for a reliable means of transport for the fan section that may be directly coupled to an intermediate transport apparatus known as a fan dolly which transfers the fan section onto the shipping frame.

DISCLOSURE OF THE INVENTION

In the most broad disclosure of the invention, a shipping frame for securing and transporting an object such as the fan section of a jet aircraft engine is disclosed. By use of the shipping frame, a fan section may be transported in either an upright position, or it may be tilted ninety degrees (90°) so that the fan section is positioned on its end in a horizontal position. Shipping the fan section in the upright mode is acceptable when shipping the fan section by means of, for example, the cargo hold of a Boeing 747 jet aircraft or on a truck. However, if the fan section is to be transported, for example, by a C130 cargo aircraft, the fan section must be positioned on its A-flange or end because the height of the rear cargo hatch of the C130 aircraft is too small to accept a vertically positioned fan section of an aircraft such as a Boeing 777 aircraft. Furthermore, the shipping frame may be coupled to a fan dolly enabling direct loading of the fan section onto the shipping frame.

Structurally, the shipping frame includes a frame assembly for supporting a loaded fan section and includes a plurality of caster assemblies which provide locomotive capability to the fan shipping frame. A plurality of jack mechanisms attached to the frame assembly enable the shipping frame to be positioned at a desirable height so the fan section may be loaded onto the appropriate aircraft or vehicle. As will be further explained below, rail members mounted on the frame assembly are alignable with rail members on a fan dolly so that the fan section may be directly transferred onto the shipping frame. Once the fan section is transferred to the shipping frame, the fan section is secured thereon by means of a template which aligns with the attaching ring of the fan section. If it is necessary to tilt the fan section ninety degrees (90°) to the horizontal for transport, a novel platform assembly is deployed enabling the fan section to be tilted without the aid of external equipment. Mounted on the fan shipping frame is a storage container which may receive and store the fan blades of the fan section in either the upright or the tilted mode. The storage container includes a plurality of storage cells which have unique curved shapes which match the shape of the fan blades.

In one embodiment, the shipping frame includes a vertically displaceable member in the form of a telescoping template support group which enables the template to be raised or lowered to a specified height in order to allow it to be connected to the attaching ring of fan sections of differing sizes and heights. Depending upon the type of fan section to be transported by means of the shipping frame, the effective diameter of the template can be modified in order to match the size of the attaching ring of the particular fan section.

Additional advantages of this invention will become apparent from the description that follows, taken in conjunction with the accompanying drawings.

BRIEF DESCRIPTION OF THE DRAWINGS

FIG. 6 is a side elevation of the fan dolly connected to the fan shipping frame wherein the fan section is mounted on the fan dolly;

FIG. 6a is an enlarged fragmentary exploded perspective view of the connection between the fan dolly and fan shipping frame;

FIG. 7 is a side elevation, as shown in FIG. 6, illustrating the fan section being transferred from the fan dolly to the fan shipping frame;

BEST MODE FOR CARRYING OUT THE INVENTION

Figure 1:
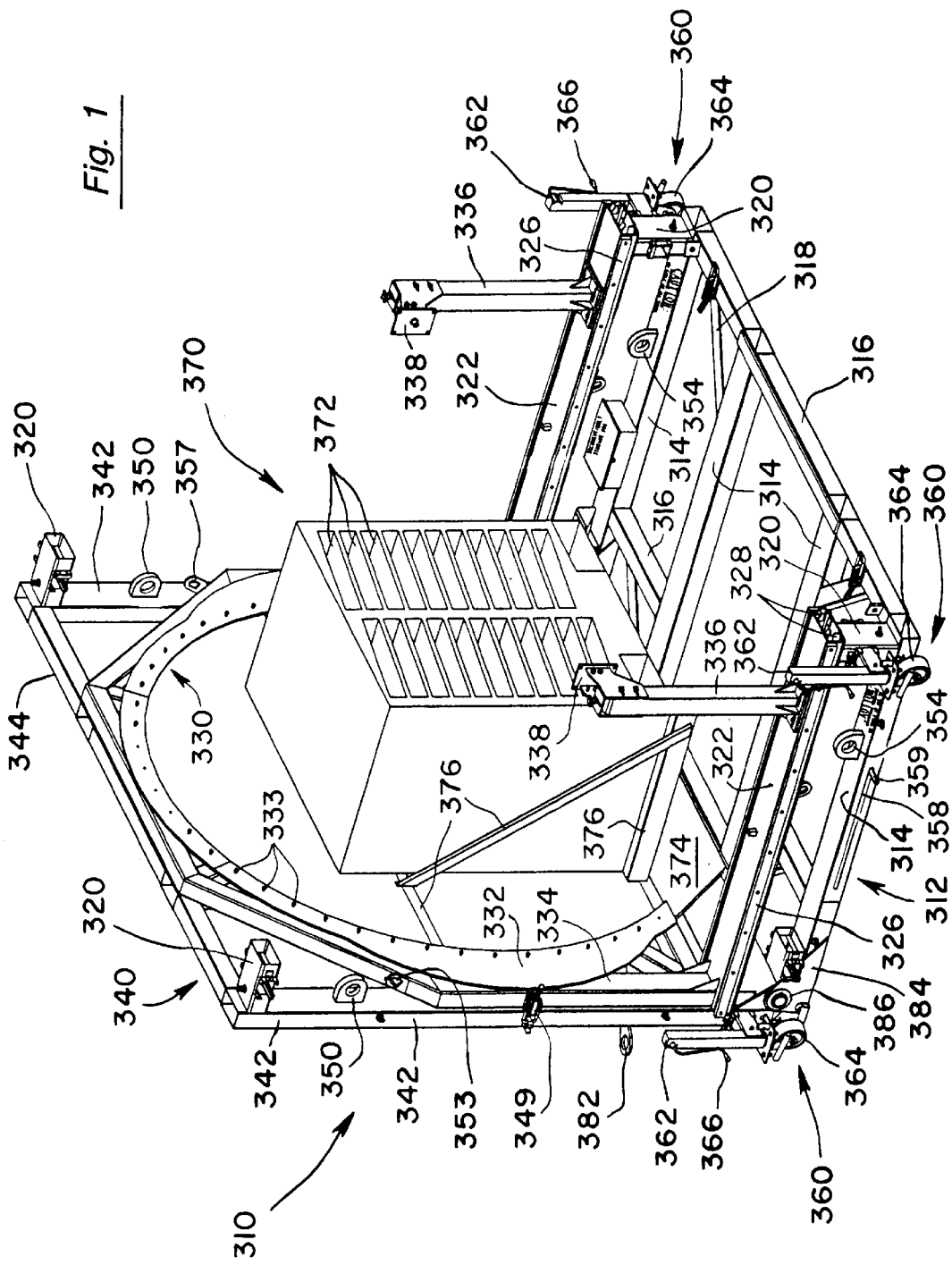
FIG. 1 is a perspective view of the fan shipping frame of this invention.
Figure 2:
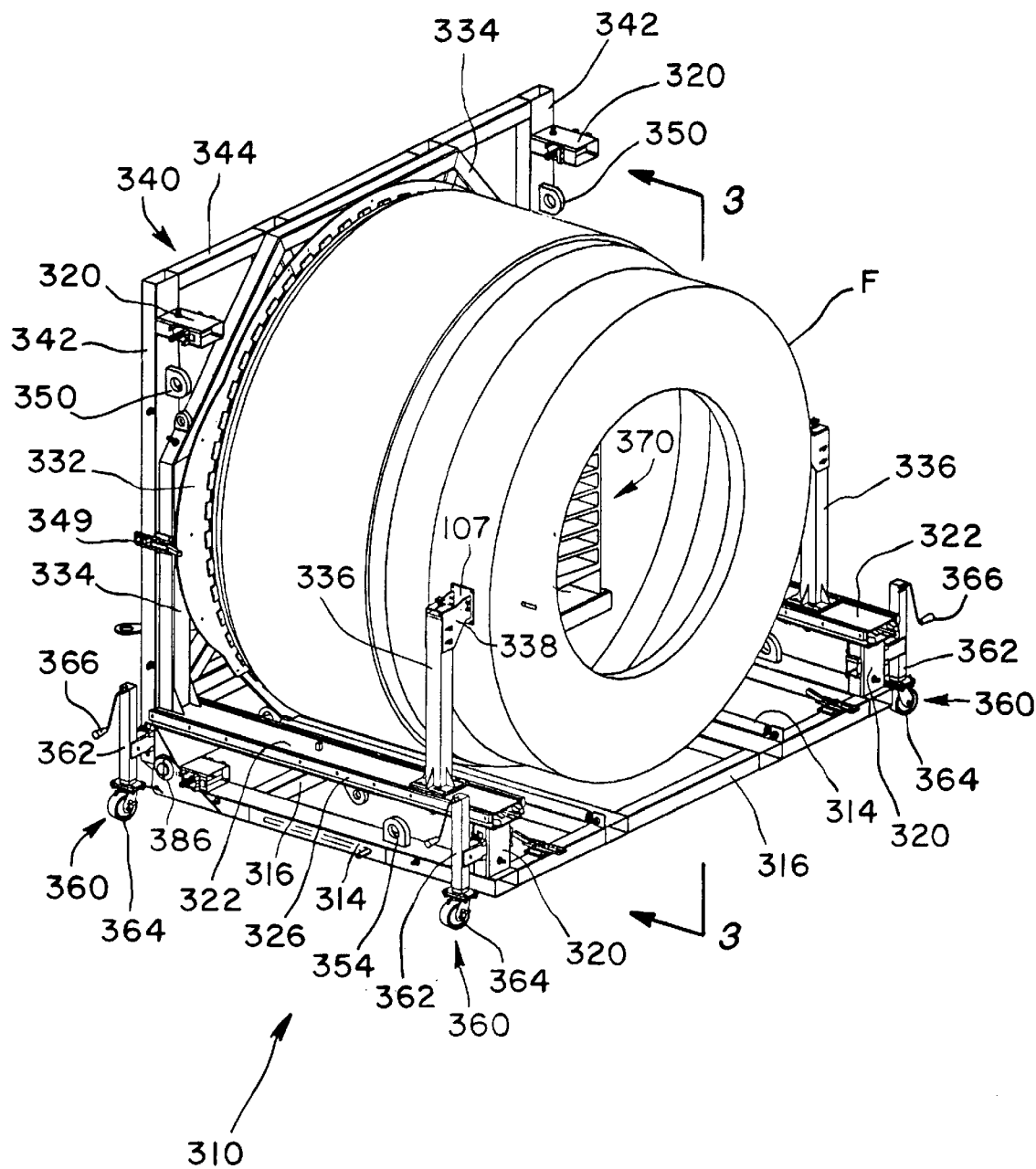
FIG. 2 is a perspective view of the fan shipping frame of this invention with a fan section mounted thereon.

According to the fan shipping frame 310 of this invention, as best seen in FIG. 1, it includes a frame assembly 312 having a plurality of longitudinal members 314 interconnected by a plurality of transverse members 316. Additionally, to provide greater frame support, diagonal members 318 are interspersed along the frame assembly and attached to members 314 and 316. The frame assembly may be assembled by welding the members together or, alternatively, an appropriate bolt and nut combination may be utilized.

Mounted on each corner of the frame assembly 312 is a pylon 320. As best seen in FIG. 1, pylons 320 serve to connect rail members 322 to the frame assembly 312. As shown, a pair of rail members 322 are mounted in parallel relationship on the frame assembly 312. Rail members 322 connect with rail members 20 of fan dolly 10. Fan dolly 10 is an apparatus which releasably secures the fan section F of a jet aircraft engine and which enables the fan section F to be loaded directly onto the shipping frame 310 of this invention without the use of external equipment such as complex pulley or winch systems. The fan dolly 10 described and illustrated herein is constructed by Stanley Aviation Corporation of Aurora, Colorado. The fan dolly 10 includes a plurality of caster assemblies 40 which enable the fan dolly to be rolled up adjacent the shipping frame 310. The fan section F is secured to the fan dolly 10 by means of a pair of fan support assemblies 60. Attached at the lower end of each support assembly 60 is a corresponding train assembly 120. Train assembly 120 includes a plurality of internal rollers (not shown) which engage with tracks 126 and which enable the fan section F to be traversed across the fan dolly 10. Tracks 126 are mounted on opposing external sides of rail members 20. In the same manner, tracks 326 are mounted on opposing external sides of rail members 322. Thus, when the fan dolly 10 is coupled to the shipping frame 310, the fan section F is initially secured by means of the fan support assemblies 60 and then train assembly 120 is traversed to engage with the aligned tracks 322 of the shipping frame 310, as will be further explained below.

Figure 5:
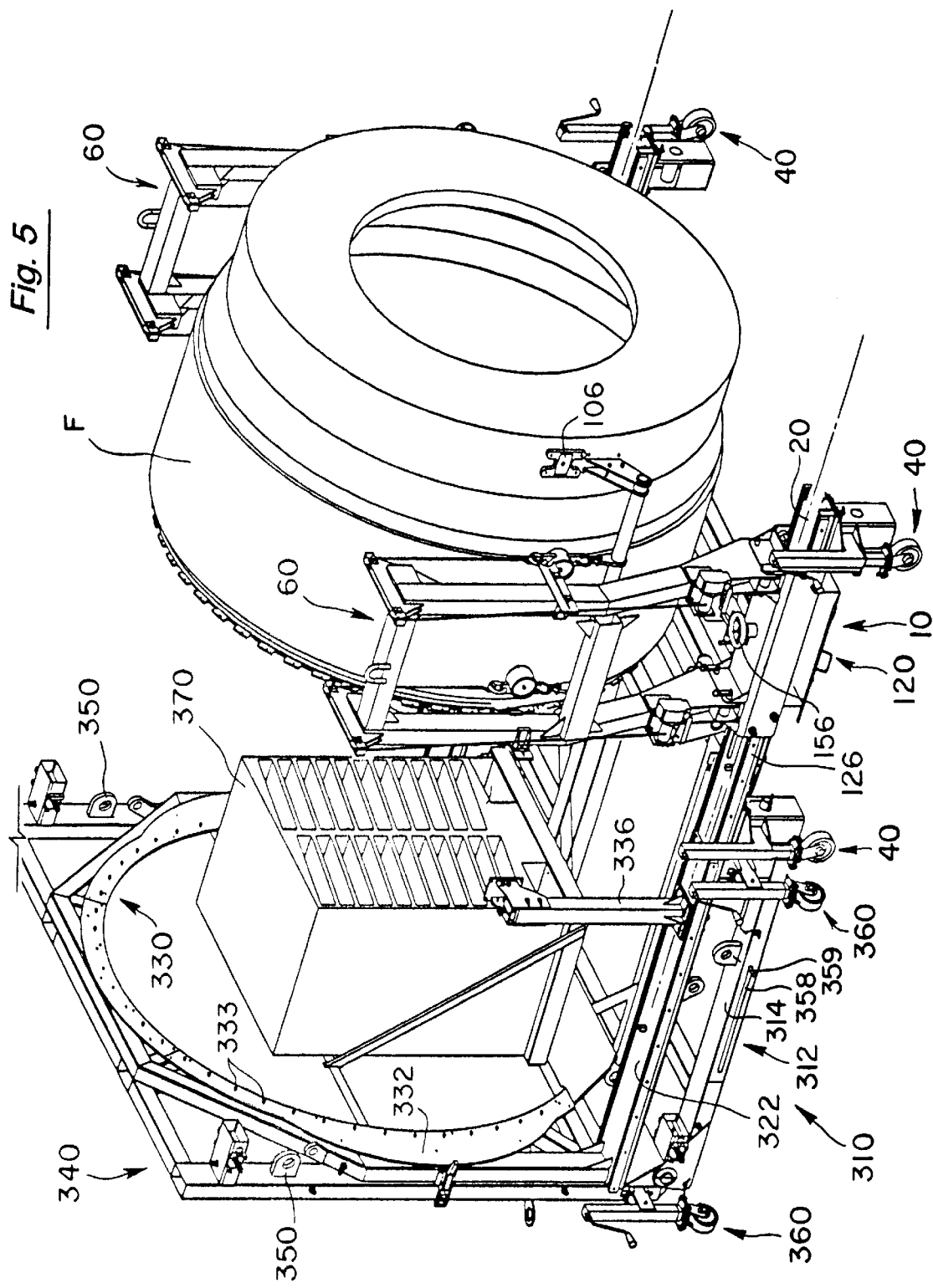
FIG. 5 is a perspective view of a fan dolly coupled to the fan shipping frame of this invention.

As best seen in FIGS. 5 and 6a, rail members 322 are engageable with the rail members 20 of a fan dolly 10 as by male connecting members 323 which are inserted within the interior space of rail members 20. Rail members 322 include exterior tracks 326 which are disposed on each side of the corresponding rail member and which engage with the interior rollers (not shown) of the train assembly 120. Thus, when the fan section F is loaded on the fan dolly 10 and the fan dolly 10 is coupled to the fan shipping frame 310, train assembly 120 is manipulated, or the fan section may be simply pushed across onto the shipping frame 310 wherein the rolling engagement of the interior rollers with tracks 326 enables the direct transfer of the fan section F onto the shipping frame 310.

In addition to the pylons 320 which attach rail members 322 to the frame assembly 312, there is also a pair of pylons 320 which are positioned on the platform assembly 340. As will be discussed below, the pylons 320 on platform assembly 340 enable caster assemblies 360 to be attached thereto in order to provide locomotive and lift capability to the fan shipping frame when the fan shipping frame is tilted to the horizontal position.

Figure 3:
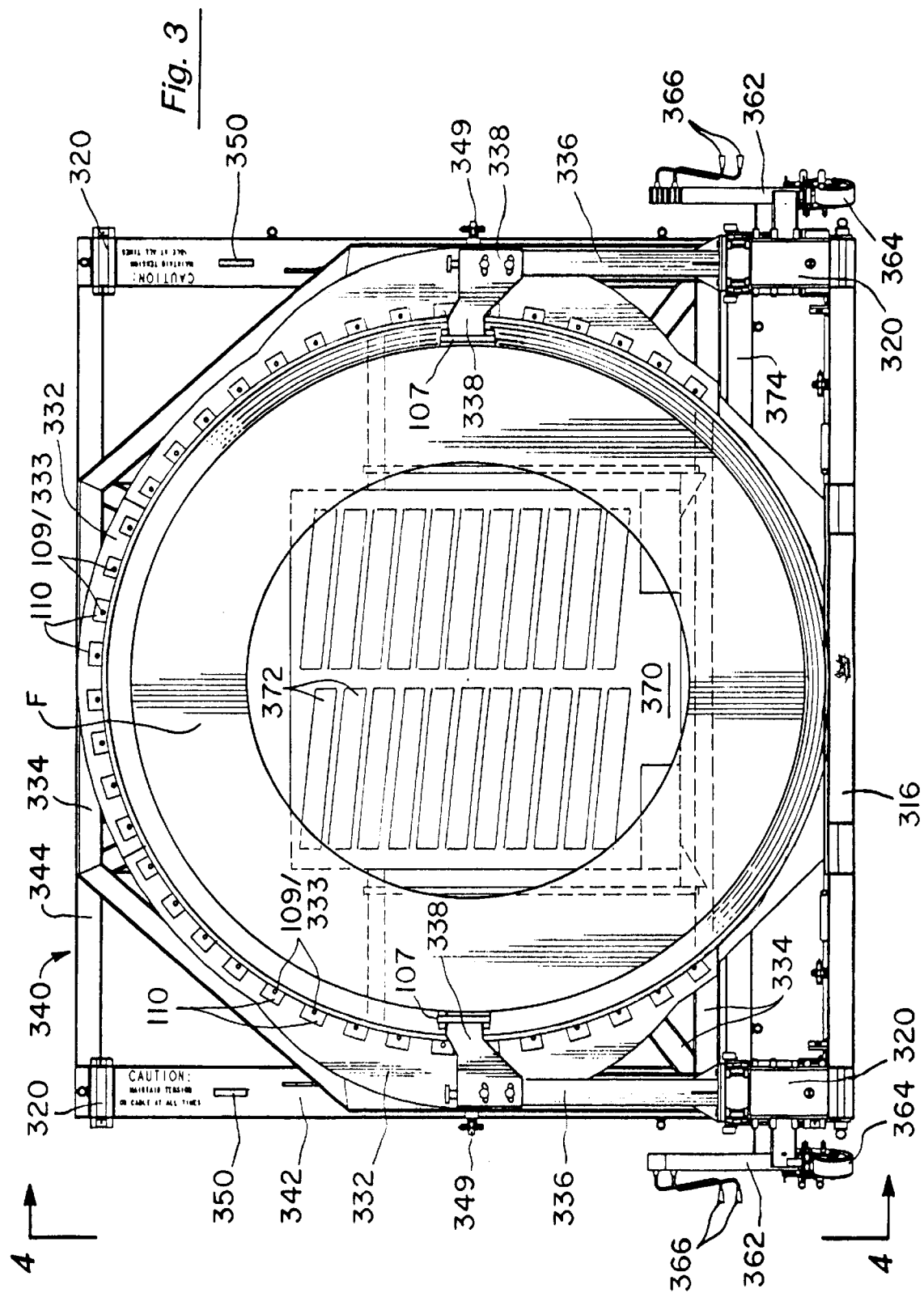
FIG. 3 is a rear elevation of the fan shipping frame of this invention with a fan section mounted thereon.

As seen in FIGS. 1 and 3, when the fan section F is loaded on the shipping frame 310, the fan section F is secured to fan support assembly 330 by means of a plurality of bolts (not shown) which extend through template 332 of fan support assembly 330; template 332 having a plurality of bolt holes 333 which align with bolt holes 109 of attaching ring 110. The template 332 is secured to the platform assembly 340 by means of a plurality of template bracket bars 334. In addition to template 332, a pair of stanchion stabilizers 336 are provided to secure the free end fan section F to the fan shipping frame 310. Stanchion stabilizers 336 attach to rail members 322. The upper end of stanchion stabilizers 336 include stanchion attachment brackets 338 which engage with the ground handling pads 107 of fan section F.

In order that the shipping frame 310 may be tilted to a horizontal position for transport on aircraft such as a C130, platform assembly 340 is provided which connects with frame assembly 312 by means of hinge mechanism 386. Platform assembly 340 includes a pair of longitudinal bars 342 interconnected by cross bar 344. As will be discussed below in reference to FIGS. 10 through 13, hinge mechanism 386 enables platform assembly 340 to rotate so that platform assembly 340 lies opposite to and in line with frame assembly 312. When the fan shipping frame is configured in the upright or vertical position, platform assembly 340 is secured to template bracket bars 334 by means of a pair of platform locks 349.

Mounted to pylons 320 are caster assemblies 360. Each caster assembly 360 includes a jack mechanism 362 with corresponding hand crank 366 which enables the fan shipping frame 310 to be adjusted to the desired height by engaging hand cranks 366. Integral with jack mechanisms 362 are wheels or casters 364 which provide the necessary locomotive capability to the fan shipping frame. Caster assemblies 360 may be mounted on either the frame assembly 312 or the platform assembly 340, depending upon how the fan section is configured for transport.

Figure 4:
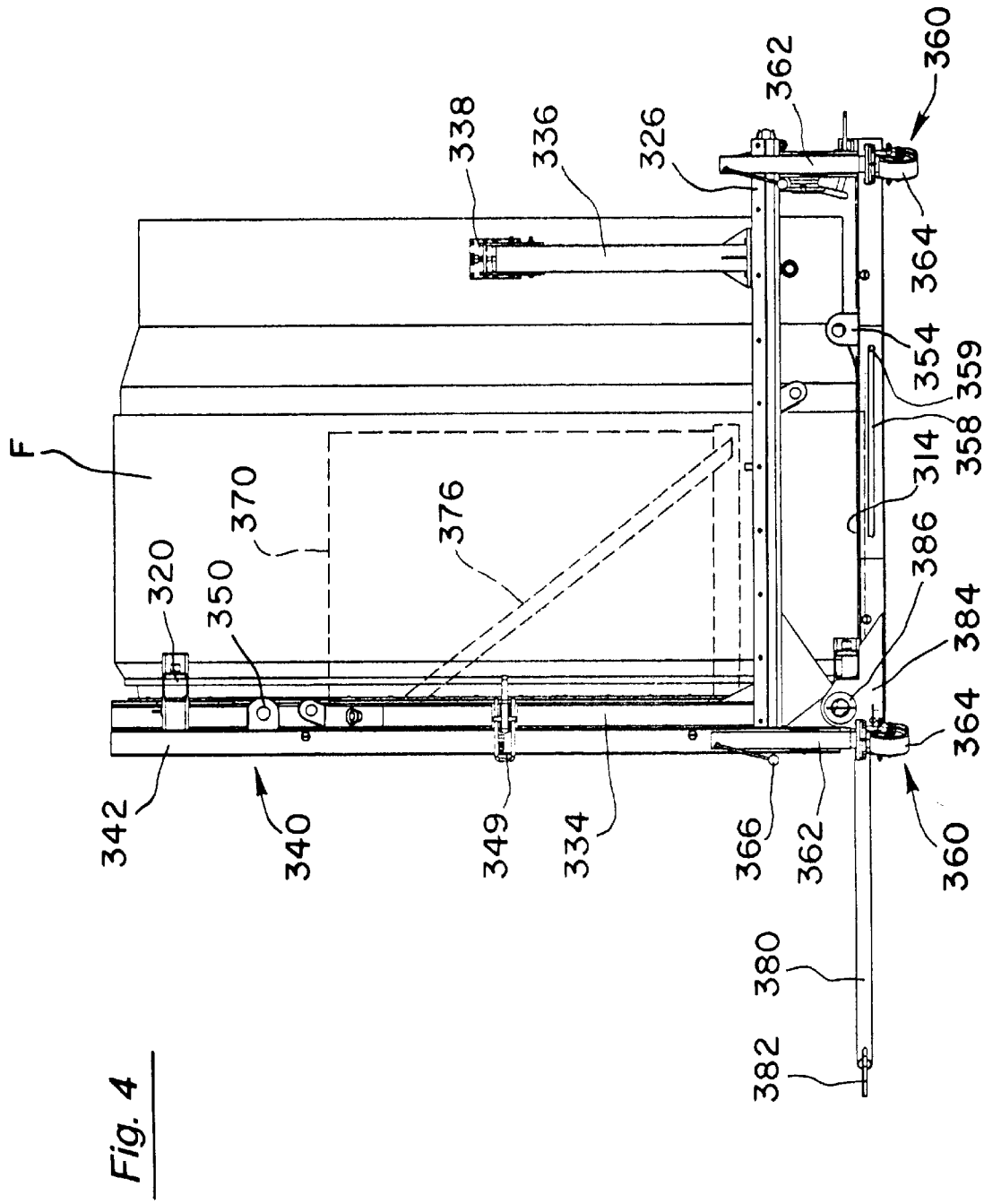
FIG. 4 is a side elevation of the fan shipping frame of this invention with a fan section mounted thereon.

Typically, when the fan section F is transported on the shipping frame 310, the inlet cowl (not shown) is first removed and then, the individual fan blades (not shown) of the fan section are also removed therefrom. Conveniently, fan blade storage container 370 is provided which may mount upon frame assembly 312. Fan blade storage container 370 includes a plurality of storage cells 372, as best seen in FIGS. 1 and 3, which are adapted to receive the fan blades of the fan section F. Thus, regardless whether the fan section F is being transported in the vertical or horizontal position on the fan shipping frame 310, the fan blade storage container 370 provides a means for securing and transporting the fan blades. As best seen in FIG. 1, container 370 is mounted to the shipping frame 310 by means of support brackets 376 which connect to the frame assembly 312 and platform assembly 340. Splash guard 374 is mounted to frame assembly 312 and is provided to protect storage container 370. As illustrated in FIG. 4, if it is necessary to transport the shipping frame 310 over the ground by a vehicle, conveniently, tow extension 380 attaches to frame assembly 312 wherein pintle 382 connects to the ball hitch of the vehicle.

Figure 8:
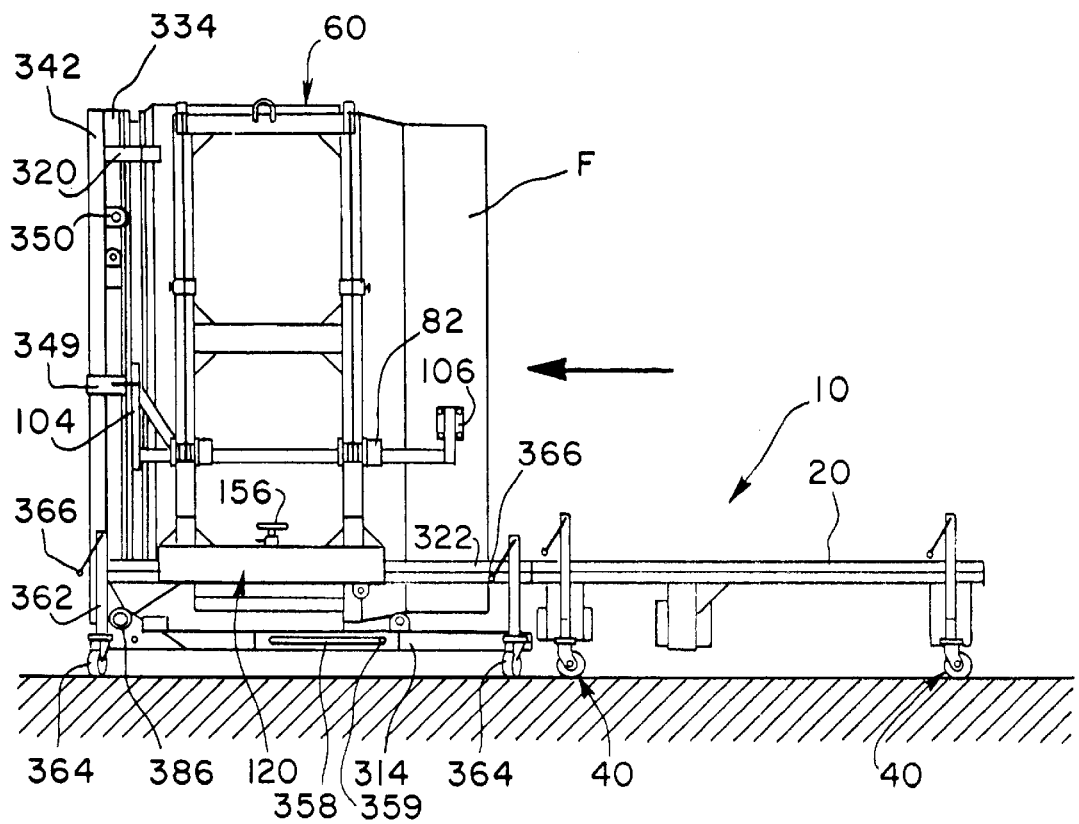
FIG. 8 is a side elevation, as shown in FIGS. 6 and 7, illustrating the fan section after being transferred from the fan dolly to the fan shipping frame.
Figure 9:
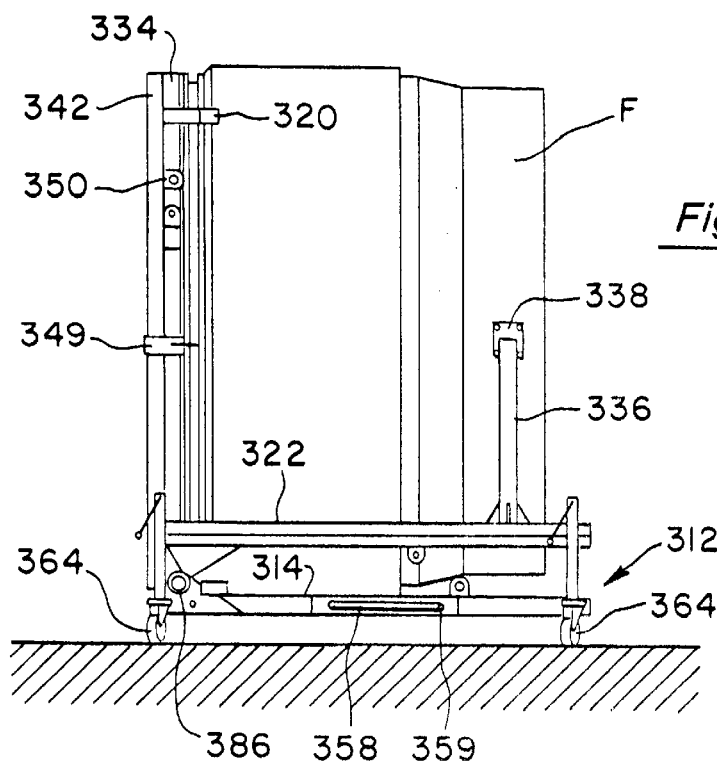
FIG. 9 is a side elevation of the fan shipping frame after the fan dolly has been separated therefrom.

As shown in FIG. 7, fan section F may be transferred onto shipping frame 310 by manipulating traversing wheels 156 of train assemblies 120 or by simply pushing the fan section F to cause the fan section F to displace along rail members 20 and then onto rail members 322. Prior to the transfer of the fan section F onto the shipping frame 310, the stanchion stabilizers 336 must be removed since they are mounted on rail members 322. As shown in FIG. 8, once the fan section F has been completely moved onto the fan shipping frame 310, the fan section F is then in a position for securing it to the shipping frame by aligning the template 332 with attaching ring 110 of the fan section F. Attaching ring 110 includes a plurality of spaced bolt holes 109. The holes 333 of template 332 are aligned with holes 109 and then a plurality of bolts or securing pins (not shown) are passed through the aligned holes 109 and 333. Once the attaching ring 110 is secured to the shipping frame 310, as best seen in FIG. 9, brackets 104 and 106 may be disengaged from the fan section F, and train assemblies 120 may be displaced back across the shipping frame 310 onto fan dolly 10. Shipping frame 310 may then be separated from the fan dolly 10 resulting in the fan section F being fully supported solely by the shipping frame 310. After the disengagement of brackets 104 and 106, stanchion stabilizers 336 are repositioned on rail members 322 and stanchion attachment brackets 338 are connected to ground handling pads 107.

Figures 10, 11:
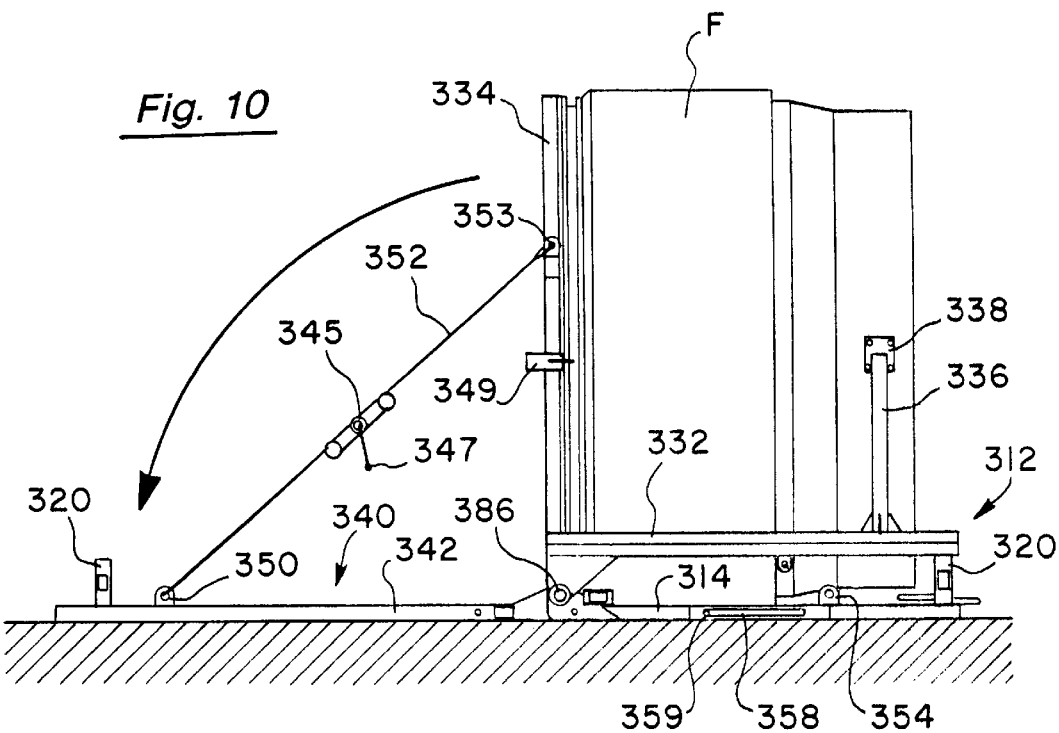
FIG. 10 is a side elevation of the fan shipping frame with fan section mounted thereon illustrating the deployment of the platform assembly.
FIG. 11 is a side elevation, as shown in FIG. 10, illustrating a pair of chain hoists being used to stabilize the loaded fan section when tipped from an upright or vertical position to a horizontal or tipped position.
Figure 12:
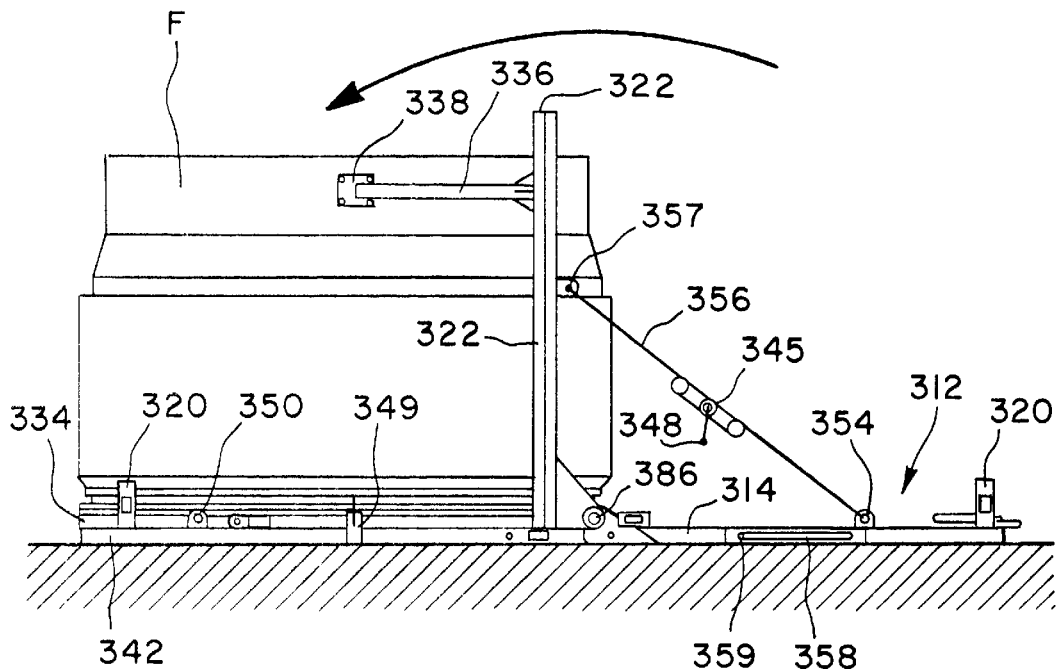
FIG. 12 is a side elevation, as shown in FIGS. 10 and 11, illustrating the fan section loaded on the fan shipping frame that has been completely rotated or tilted to the horizontal position.
Figure 13:
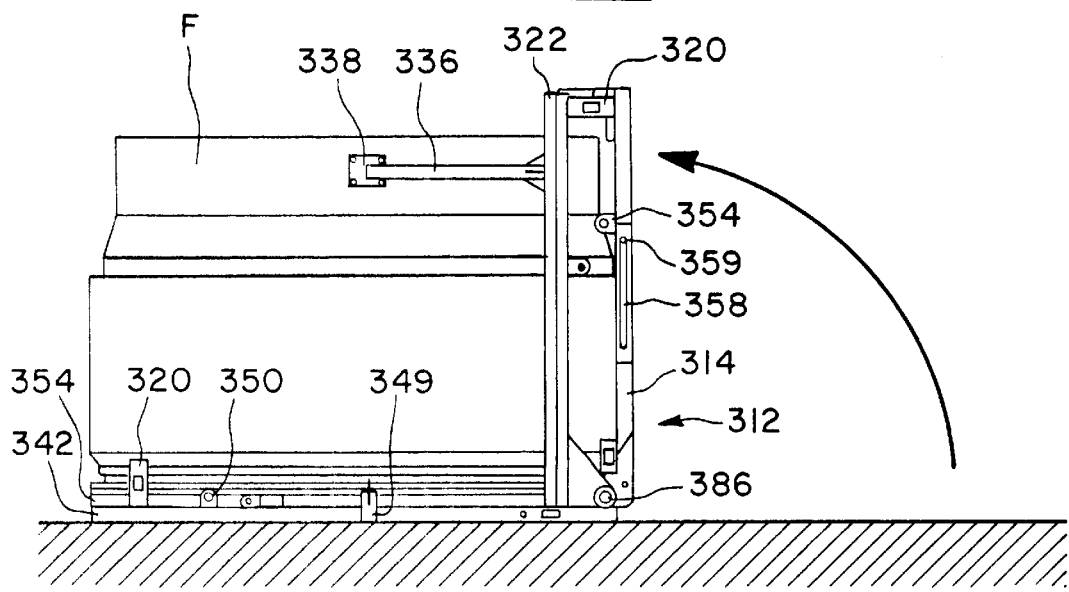
FIG. 13 is a side elevation, as shown in FIGS. 10–12, illustrating the frame assembly of the fan shipping frame reattached to the fan section.

Once stabilizers 336 have been reattached, the shipping frame is prepared for rotation to the horizontal transport position if it is necessary to transport the fan section F on an aircraft such as a C130. As shown in FIG. 10, the rotating or tipping operation commences with deployment of the platform assembly 340. In accordance therewith, a pair of opposing chain hoists 345 and 346 with corresponding handles 347 and 348 are secured to the shipping frame and platform locks 349 may then be unlocked. Chain hoist 345 is secured between template bracket 334 and longitudinal bar 342 by means of a cable or chain 352 which attaches at opposing ends to platform retaining eye 350 and anchor point 353. The other chain hoist 346 is secured between longitudinal member 314 and rail member 322 by means of cable or chain 356 which attaches at opposing ends to frame retaining eye 354 and anchor point 357. Hand crank 347 of chain hoist 345 is manipulated to lower the platform assembly 340 by means of corresponding chain 352. Hand crank 347 is manipulated until the platform assembly 340 rests on the ground. As shown in FIG. 10, caster assemblies 360 have been removed from the shipping frame 310. In most circumstances, it is desirable to remove the caster assemblies because, during the tipping operation, it is necessary that the shipping frame be in a completely stable and stationary position. As shown in FIG. 11, once platform assembly 340 has been deployed, fan section F may be rotated or tipped to the horizontal transport position. Accordingly, chain hoist 346 is manipulated by hand crank 348 to enable the deployment of chain 356 which, in turn, enables the fan section F to be tipped onto platform 342. Hinge mechanism 386 enables the fan section F to rotate from the vertical position to the horizontal position. However, because of the tremendous load placed on the hinge when the fan section F is halfway between the vertical and horizontal, it may be necessary to provide additional structural support to the hinge. Accordingly, a support bar (not shown) may be placed inside each longitudinal member 314 and slidable into the abutted longitudinal bar 342 when the fan section F is tipped. A longitudinal slot 358 may be formed in each longitudinal member 314 wherein a handle 359 attached to the support bar enables manipulation of the support bar into and out of longitudinal bar 342. Typically, the support bar may be inserted into longitudinal bar 342 so that approximately one-half of the support bar is positionable in both the longitudinal bar 342 and longitudinal member 314. As shown in FIG. 12, the fan section F is tipped completely to the horizontal position. In this configuration, it is now necessary to raise frame assembly 312 to a vertical position. Accordingly, hand crank 348 is again manipulated to draw in chain 356. Once the frame assembly is brought flush up against rail members 322, latch mechanisms (not shown) are activated to securely lock the frame assembly 312 in place.

Once the tipping or rotating operation is complete, caster assemblies 360 may be reattached to the pylons 320 located on platform assembly 340 enabling fan section F to be transported in the horizontal position.

Although the above rotation procedure has been described in rotation of the fan section F from the vertical to the horizontal position, the above procedure can be reversed enabling the fan section F to be rotated from the horizontal to the vertical position. This reversed rotation may be necessary depending upon the type of aircraft(s) used to transport the fan section.

To be able to observe the amount of tension placed on chains 352 and 356, load indicating devices such as dynamometers (not shown) may be placed in-line between the ends of chains 352 and 356 and their corresponding retaining eyes 350 and 354. This load indication ensures that one particular chain hoist is not under or overloaded which in turn ensures that there is a smooth rotation of the fan section F from the vertical to the horizontal or vice versa.

Since FIGS. 10 through 13 are elevational views which only show one side of the apparatus, it will be understood that hoists 345 and 346 are each deployed in pairs, each pair positioned on opposing lateral sides of the shipping frame. Thus, four chain hoists may be used to tip the fan section F. Although chain hoists are illustrated in the preferred embodiment, it will be understood that other types of securing devices may be used such as ratchets or locking pulley systems.

FIGS. 14–17 illustrate another preferred embodiment of the fan shipping frame of this invention which further adds, among other elements discussed below, a pair of vertically displaceable members in the form of telescoping template support groups which enable the template 332 to be raised or lowered to a desired height in order to receive fan sections which may have differing heights when mounted upon a structure such as the fan dolly. Furthermore, it will be understood that the effective diameter of the circular shaped template 332 may be increased or decreased in order to accommodate the particular circular diameter of the fan section which is received by the fan shipping frame of this invention.

Figure 14:
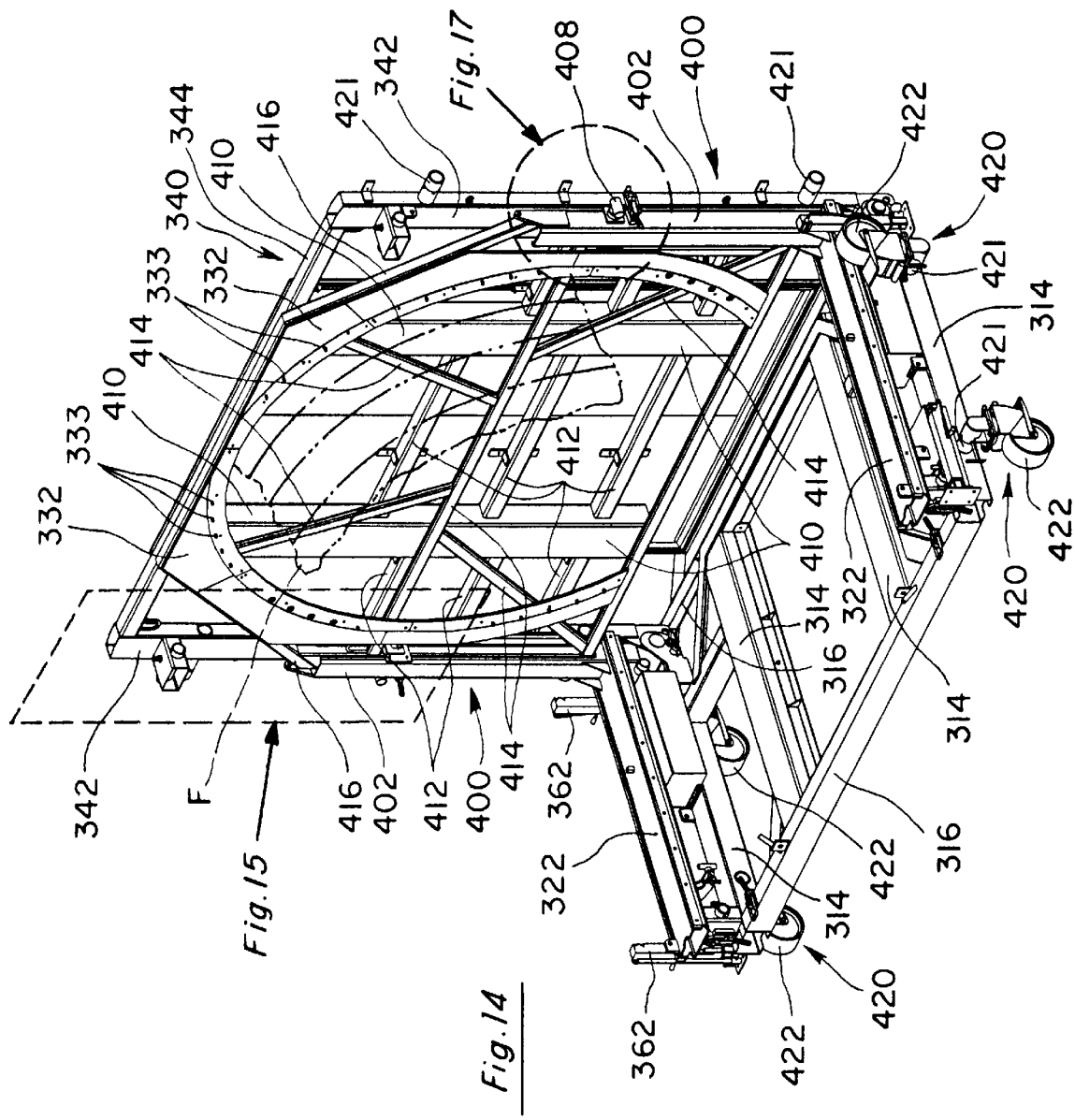
FIG. 14 is a perspective view of another preferred embodiment of the fan shipping frame of this invention illustrating the use of a pair of vertically displaceable members in the form of corresponding telescoping template support groups.

As shown in FIG. 14, the fan shipping frame of this embodiment is very similar to the fan shipping frame illustrated in FIG. 1, with the notable exception that the template 332 may be raised or lowered. The structure enabling this raising or lowering capability is found in the pair of telescoping template support groups 400 which essentially replace the vertical members of the template bracket 334 of the first embodiment. In addition to the telescoping template support groups 400 which will be described in further detail below, the overall load capability of the fan shipping frame may be enhanced by increasing the number of support members thereon. More specifically, one or more vertical platform assembly bars 410 may be connected to cross bar 344, and horizontal platform bars 412 may be connected between the platform assembly bars 410 and longitudinal bars 342. The combination of bars 410 and bars 412 provide additional structural support to the platform assembly 340. In addition to structurally enhancing the load capability of the platform assembly 340, the structural members which support the fan support assembly 330 can be enhanced by the addition of template support members 414 which are characterized by a plurality of channels or bars which extend between the pair of opposed telescoping template support groups 400 and the upper template support members 416.

Figure 15:
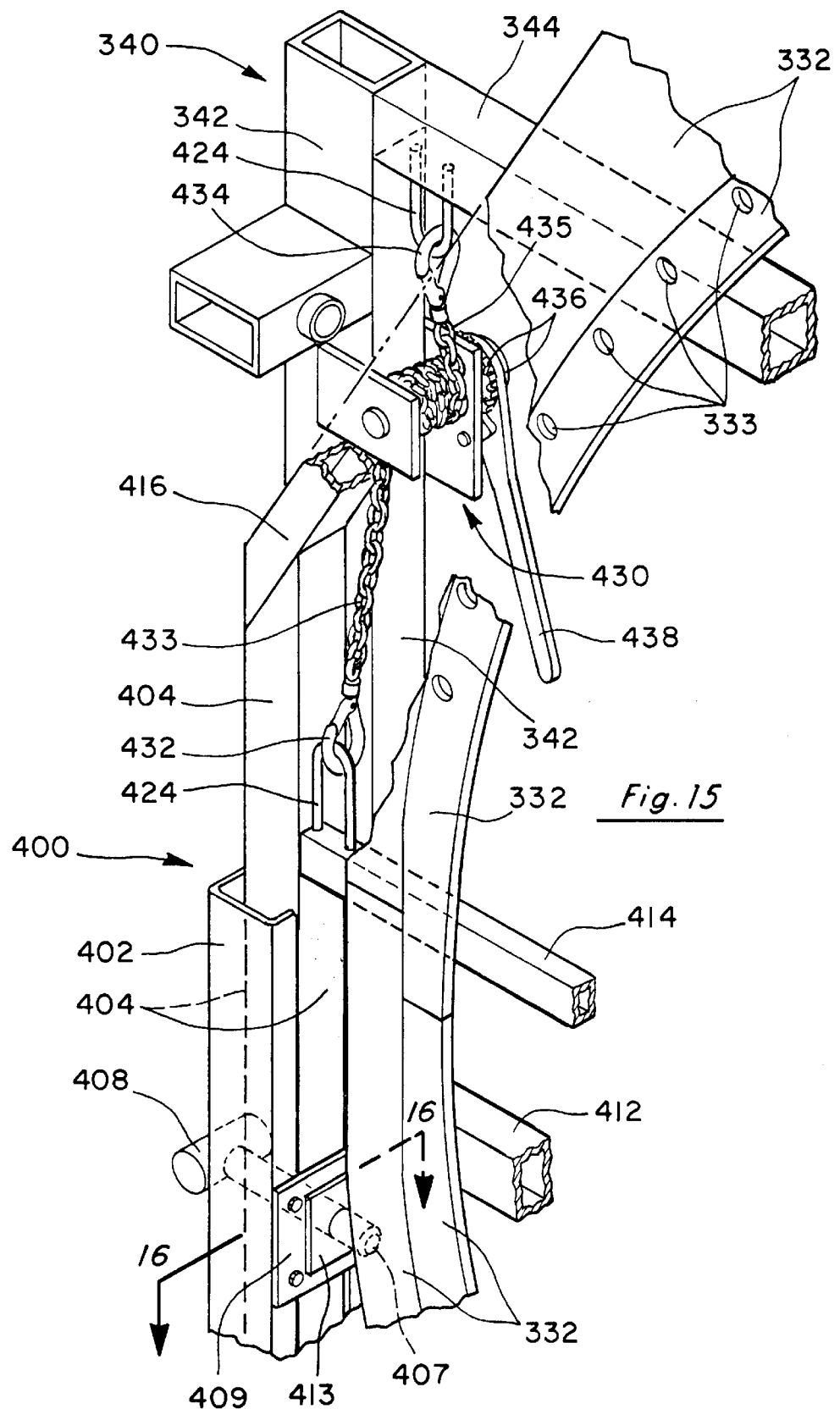
FIG. 15 is a greatly enlarged left side fragmentary perspective view of a telescoping template support group.
Figure 16:
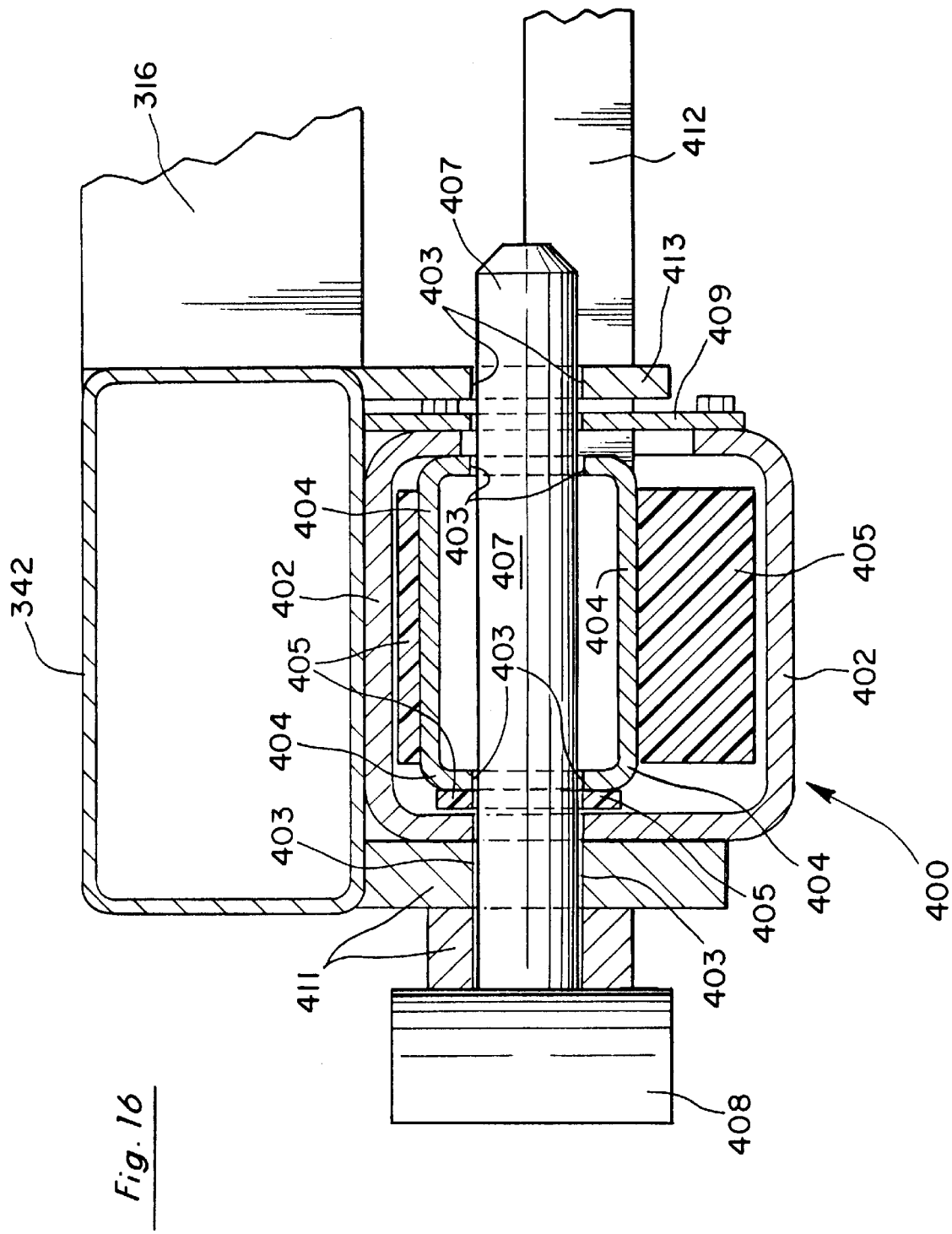
FIG. 16 is a horizontal section, taken along line 16—16 of FIG. 15 illustrating some of the interior details of a telescoping template support group.
Figure 17:
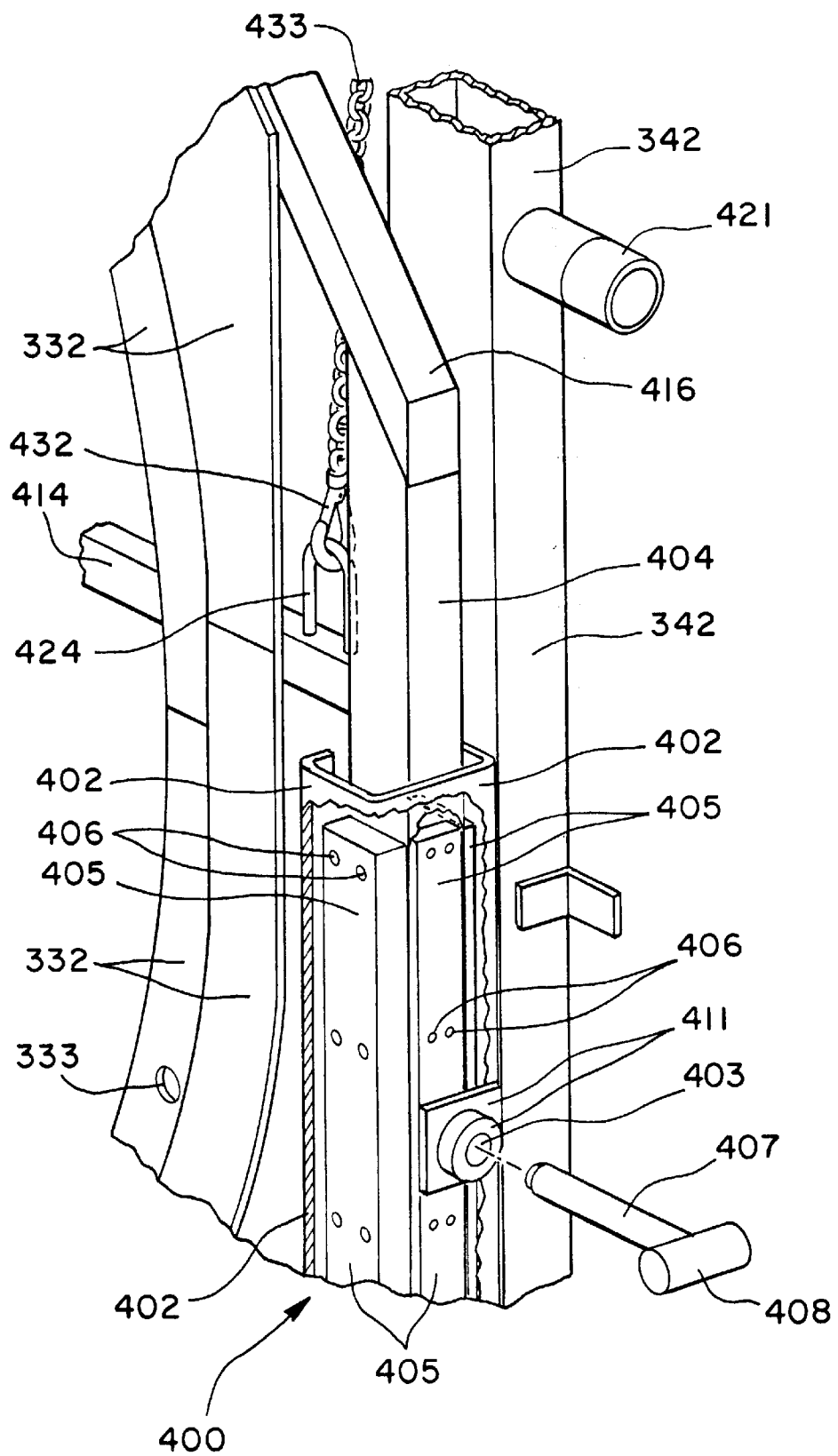
FIG. 17 is a greatly enlarged right side fragmentary perspective view illustrating some additional interior details of a telescoping template support group.

Now referring to FIGS. 15–17, a telescoping template support group 400 includes two primary structures arranged in a telescoping relationship which enables the template 332 to be raised or lowered. These two primary structures are illustrated as outer channel 402 and inner vertical support 404. As shown in FIG. 15, outer channel 402 may be formed of a C-shaped channel member having a longitudinal opening which is adapted to receive inner vertical support 404. FIG. 16 best illustrates the shape of vertical support 404 which may be a four-sided tubular structure. One or more antifriction sheets 405 are attached to the exterior sides of inner vertical support 404 by means of fasteners 406. The purpose of antifriction sheets 405 is to prevent metal-to-metal contact between outer channel 402 and inner support 404 and therefore enabling inner support 404 to easily slide within outer channel 402. Such metal-to-metal contact if not prevented can make it very difficult to raise or lower the template 332 to the desired position. As shown in FIG. 16, there are three antifriction sheets 405; one sheet attached on the front side of the support 404; another sheet attached to the back side of the support 404, and another sheet attached to the outside end of support 404. Also as shown, the antifriction sheets 405 may be made of differing thicknesses in order that a minimal clearance exists between the exterior surfaces of such antifriction sheets and the interior sides of outer channel 402. One preferred material for the antifriction sheets 405 is known in the art as UHMW (Ultra High Molecular Weight). Antifriction sheets 405 best prevent undesirable metal-to-metal contact between outer channel 402 and inner vertical support 404 by extending along a majority of the length of inner vertical support 404.

In order to lock the template 332 into the desired vertical position, pin 407 and integral T-shaped pin handle 408 are provided to extend through outer channel 402 and inner vertical support 404. As best seen in FIGS. 16 and 17, an opening 403 may be drilled or otherwise formed through outer channel 402 and inner vertical support 404 in order to receive pin 407 therethrough. Pin handle 408 extends exteriorly of outer channel 402 when the pin is inserted in opening 403. Additionally, the opening 403 may be centered through a stop plate 409 which can be attached to the interior side edge of outer channel 402. Stop plate 409 provides a stable structure in which the distal end of pin 407 may reside after being inserted completely through outer channel 402 and inner vertical support 404. Additionally, reinforcing plate 413 may be provided adjacent plate 409 to provide further support and stability when pin 407 is fully inserted.

FIG. 14 illustrates the template 332 in a lowered position wherein the upper edge of the template 332 is substantially flush with cross bar 344. Optionally, the template may be raised as shown in FIG. 15 wherein the template 332 is raised above the level of cross bar 344.

Although FIG. 17 only illustrates one opening 403, it will be understood that any number of openings can be formed through outer channel 402 and inner vertical support 404 in order to provide multiple vertical positions in which the template 332 may be positioned.

Attachment rings 424 may be formed on template support members 414 and the lower surface of cross bar 344. As shown in FIG. 15, a chain hoist 430 may be positioned between opposing attachment rings 424. One commercially available chain hoist which is proven adequate for raising or lowering the template is a chain hoist manufactured by Tug-It™. As illustrated in FIG. 15, the chain hoist 430 includes hooks 432 and 434 and their corresponding chain members 433 and 435 respectively, which communicate with ratchet mechanism 436. Handle 438 is manipulated to activate the ratchet mechanism which in turn causes the opposing hooks 432 and 434 to be either drawn together or allowed to extend further apart. Those skilled in the art can envision other means by which a lifting device can raise or lower the template. For example, a common pulley system or other types of commercially available chain hoists may be used.

Another modification illustrated in this second embodiment is the use of caster assemblies 420 which attach directly to the exterior sides of longitudinal members 314. When the shipping frame is tipped to the horizontal position, the caster assemblies 420 may also be mounted to the platform assembly 340 by attaching to the exterior edges of longitudinal bars 342. Caster assemblies 420 are mounted to longitudinal members 314 and longitudinal bars 342 by means of caster mounts 421 which protrude therefrom. The upper end of each caster assembly 420 includes a mount portion which fits over caster mounts 421. FIG. 14 illustrates the two right side caster assemblies without their corresponding jack mechanisms 362 in order to show the connection between caster mounts 421 and the mount portions of the caster assemblies. Optionally, each caster assembly 420 may be rotated about its corresponding caster mount 421 such that the wheel 422 of the particular caster assembly no longer makes contact with the ground. This rotatable feature of caster assembly 420 is particularly desirable when the fan section has been transported to a more permanent location and movement of the fan section is undesirable. In this circumstance, each of the caster assemblies may be rotated so that the wheels cease to make contact with the ground and the frame assembly 312 makes direct contact in lieu thereof. One caster assembly that has been rotated is illustrated in FIG. 14.

Yet another modification illustrated in the second embodiment is the removal of fan blade storage container 370 and its corresponding support structure. Although the removal and separate storage of the fan blades is desirable in some circumstances, the fan section can still be transported or undergo the necessary maintenance with the fan blades attached to the fan section thus eliminating the need for the storage container 370.

This invention has been described in detail with reference to a particular embodiment thereof, but it will be understood that various other modifications can be effected within the spirit and scope of this invention.

We claim:

1. A shipping frame for transporting an object such as a loaded jet aircraft engine fan section, said shipping frame comprising:

frame means for supporting the fan section loaded thereon;

template means attached to said frame means for releasably securing the fan section thereto;

platform means rotatably connected to said frame means for selective deployment of the fan section; and telescoping support means connected to said template means for selectively raising or lowering said template means to a desired position.

2. A shipping frame, as claimed in claim 1, wherein said telescoping support means further includes:

an outer channel including a longitudinal opening; and an inner vertical support removably received in said longitudinal opening of said outer channel, and being adjustably raised or lowered to place the template means in the desired position.

3. A shipping frame, as claimed in claim 2, further including:

a plurality of antifriction sheets attached to exterior surfaces of said inner vertical support.

4. A shipping frame, as claimed in claim 1, further including:

a lifting hoist connected to said template means enabling said template means to be raised or lowered to the desired position.

5. A shipping frame, as claimed in claim 2, further including:

a pin insertable through an opening formed in said outer channel and said inner vertical support for selectively holding said inner vertical support at the desired position.

6. A shipping frame for transporting an object such as a fan section of a jet aircraft engine loaded thereon, said shipping frame comprising:

a template for releasably securing the fan section thereto;

a telescoping template support cooperating with said template for selectively raising or lowering said template to a desired vertical height; and means for selective deployment of the fan section while secured to said template to a desired position.

7. A shipping frame, as claimed in claim 6, wherein said telescoping template support further includes:

an outer channel including a longitudinal opening; and an inner vertical support removably received in said longitudinal opening of said outer channel, said inner vertical support being adjustably raised or lowered to the desired height.

8. A shipping frame, as claimed in claim 7, further including:

a plurality of antifriction sheets attached to exterior surfaces of said inner vertical support.

9. A shipping frame, as claimed in claim 6, further including:

a lifting hoist connected to said template enabling said template to be raised or lowered to the desired height.

10. A shipping frame, as claimed in claim 7, further including:

a pin insertable through an opening formed in said outer channel and said inner vertical support for selectively holding said inner vertical support at the desired height.

11. A shipping frame for transporting an object such as a jet aircraft engine fan section loaded thereon, said shipping frame comprising:

a frame for supporting the object thereon;

a template for releasably securing an end of the object thereto, said template having a first end pivotally attached to said frame and a second end extending away from said frame;

a rotatable platform member having a first end pivotally attached to said frame adjacent said first end of said template, and a second end extending away from said frame, said platform member being selectively and independently deployable with respect to said template when tipping the object to either a horizontal or vertical position such that said second ends are separated from one another during tipping, and are adjacent to one another before and after tipping; and at least one vertically displaceable member attached to said template enabling said template to be selectively raised or lowered to a desired height.

12. A shipping frame, as claimed in claim 11, wherein said at least one vertically displaceable member further includes:

an outer channel including a longitudinal opening; and an inner vertical support removably received in said longitudinal opening of said outer channel, said inner vertical support being adjustably raised or lowered to the desired height.

13. A shipping frame, as claimed in claim 12, further including:

a plurality of antifriction sheets attached to exterior surfaces of said inner vertical support.

14. A method of preparing a jet aircraft engine component for transport, said method comprising the steps of:

providing a shipping device including a vertically displaceable template;

adjusting the height of the template;

mounting the component onto the shipping device; and selectively tipping the component to a desired horizontal or vertical position in order to transport the component in either the horizontal or vertical position.

15. A method, as claimed in claim 14, wherein said selectively tipping step further includes:

selectively tipping the component about a fixed axis to the desired position.

16. A method, as claimed in claim 14, wherein said adjusting step further includes:

selectively raising or lowering the template by means of a lifting hoist connected thereto.

17. A method, as claimed in claim 14, further including the step of:

controlling the tipping of the component by a securing device.

18. A method, as claimed in claim 14, wherein said selectively tipping step farther includes the steps of:

deploying a platform member;

separating the component from a portion of the shipping device to which the component is mounted;

tipping the component to the desired position; and reattaching the component to the portion of the shipping device after the component has been tipped to the desired position.

19. A method of preparing a component of a jet aircraft engine for transport, said method comprising the steps of:

providing a shipping device including a template;

providing a vertically displaceable member on the shipping device enabling the template to be raised or lowered;

selectively raising or lowering the template to a desired height; and mounting the component onto the shipping device.

20. A method, as claimed in claim 19, further including the step of:

selectively tipping the component while attached to the shipping device in order to transport the component in a desired position.

21. A method, as claimed in claim 19, wherein said selectively raising or lowering step further includes the steps of:

attaching a hoist mechanism to the template; and manipulating the hoist mechanism to raise or lower the template.

22. A method, as claimed in claim 20, wherein said selectively tipping step further includes:

selectively tipping the component about a fixed axis to the desired position.

\* \* \* \* \*